United States Patent
Ushio et al.

(10) Patent No.: US 9,267,555 B2
(45) Date of Patent: Feb. 23, 2016

(54) LOCK-UP DEVICE FOR TORQUE CONVERTER

(71) Applicant: EXEDY Corporation, Neyagawa-shi, Osaka (JP)

(72) Inventors: Hiroyuki Ushio, Neyagawa (JP); Takeshi Kawamoto, Neyagawa (JP); Ken Mototsune, Neyagawa (JP); Shinji Fujimoto, Neyagawa (JP)

(73) Assignee: EXEDY Corporation, Osaka (JP)

( * ) Notice: Subject to any disclaimer, the term of this patent is extended or adjusted under 35 U.S.C. 154(b) by 0 days.

(21) Appl. No.: 14/360,567

(22) PCT Filed: Nov. 5, 2012

(86) PCT No.: PCT/JP2012/078646
§ 371 (c)(1),
(2) Date: May 23, 2014

(87) PCT Pub. No.: WO2013/084637
PCT Pub. Date: Jun. 13, 2013

(65) Prior Publication Data
US 2014/0262666 A1    Sep. 18, 2014

(30) Foreign Application Priority Data
Dec. 5, 2011   (JP) .................................. 2011-265585

(51) Int. Cl.
*F16H 45/02*   (2006.01)
*F16D 33/18*   (2006.01)
*F16D 47/06*   (2006.01)

(52) U.S. Cl.
CPC ................ *F16D 47/06* (2013.01); *F16D 33/18* (2013.01); *F16H 45/02* (2013.01); *F16H 2045/021* (2013.01); *F16H 2045/0221* (2013.01); *F16H 2045/0231* (2013.01); *F16H 2045/0278* (2013.01); *F16H 2045/0284* (2013.01)

(58) Field of Classification Search
CPC combination set(s) only.
See application file for complete search history.

(56) References Cited

U.S. PATENT DOCUMENTS

| | | | |
|---|---|---|---|
| 6,508,346 B1* | 1/2003 | Simpson ........................ | 192/3.3 |
| 2006/0124420 A1* | 6/2006 | Ackermann ................ | 192/3.29 |
| 2009/0247307 A1* | 10/2009 | Ishikawa et al. ............. | 464/68.8 |

FOREIGN PATENT DOCUMENTS

| | | | |
|---|---|---|---|
| JP | 05-126229 A | 5/1993 |
| JP | 09-236173 A | 9/1997 |
| JP | 2001-065664 A | 3/2001 |
| JP | 2005-036958 A | 2/2005 |
| JP | 2008-008358 A | 1/2008 |
| JP | 2010-048291 A | 3/2010 |

* cited by examiner

*Primary Examiner* — Ramya Burgess
*Assistant Examiner* — Mark Manley
(74) *Attorney, Agent, or Firm* — Global IP Counselors, LLP

(57) ABSTRACT

A lock-up device includes a clutch part and a damper mechanism. The clutch part includes a clutch input member, a clutch output member, a drive plate, a driven plate, a second flange and a piston. The second flange is mounted between a front cover and an inner peripheral part of a turbine to be axially immovable with respect to the front cover, and forms a lock-up oil chamber. The piston is mounted between the front cover and the second flange, forms a lock-up oil chamber together with the second flange therebetween, and is configured to be moved toward the front cover by an operating oil to be supplied to the lock-up oil chamber.

6 Claims, 10 Drawing Sheets

LOCK-UP DEVICE FOR TORQUE CONVERTER

CROSS-REFERENCE TO RELATED APPLICATIONS

This application is a U.S. National stage application of International Application No. PCT/JP2012/078646, filed Nov. 5, 2012, which claims priority to Japanese Patent Application No. 2011-265585, filed in Japan on Dec. 5, 2011, the entire contents of which are hereby incorporated by reference.

BACKGROUND

1. Field of Invention

The present invention relates to a lock-up device, particularly to a lock-up device for a torque converter, which is configured to transmit torque from a front cover to a transmission-side member through a turbine of the torque converter.

2. Background Information

In many cases, a torque converter is provided with a lock-up device for directly transmitting torque from a front cover to a turbine. The lock-up device includes a piston that can be frictionally coupled to the front cover, a drive plate fixed to the piston, a plurality of torsion springs supported by the drive plate, and a driven plate elastically coupled to the piston and the drive plate by the plural torsion springs in the rotational direction. The driven plate is fixed to the turbine.

Further, as described in Japanese Laid-open Patent Application Publication No. JP-A-2010-48291, a lock-up device of so-called a multi-plate type using a plurality of clutch plates has been also proposed for increasing the clutch capacity of the lock-up device.

The lock-up device described in Japanese Laid-open Patent Application Publication No. JP-A-2010-48291 includes a clutch part disposed between the front cover and the turbine, a power transmission plate connected to an output member of the clutch part, and a plurality of torsion springs configured to elastically couple the power transmission plate and the turbine. The clutch part includes a plurality of clutch plates and a piston disposed between the front cover and the plural clutch plates.

Here, when hydraulic pressure is supplied to the back of the piston, the piston is moved toward the plural clutch plates. The clutch plates are thereby pressed against each other. Accordingly, a lock-up state (power transmitted state) is produced. In this state, torque from the front cover is transmitted to the power transmission plate through the clutch part, and is further transmitted to the turbine through the plural torsion springs.

SUMMARY

In the device described in the above-mentioned Japanese Publication, a member composing the clutch part and a member for supporting the power transmission plate are disposed between the front cover and the turbine inner peripheral part. Therefore, the clutch part is inevitably disposed radially outward of these components.

Further, in the clutch part, a lock-up oil chamber is formed between the front cover and the piston, whereas a plurality of clutch plates and a backing plate for supporting these clutch plates are disposed between the piston and the turbine.

It is difficult for the well-known lock-up device of the multi-plate type as described above to reduce the axial space thereof.

It is an object of the present invention to form a lock-up device of a multi-plate type in an axially compact dimension by devising arrangement of a piston and an oil chamber.

A lock-up device for a torque converter according to a first aspect of the present invention is a device configured to transmit a torque from a front cover to a transmission-side member through a turbine of the torque converter, and includes a clutch part and a damper mechanism. The clutch part is disposed between the front cover and the turbine, and is configured to allow or block transmission of the torque. The damper mechanism is configured to transmit the torque from the clutch part to the turbine and to absorb and attenuate a torsional vibration. Further, the clutch part includes a clutch input member disposed between the front cover and the turbine while being coupled to the front cover, a clutch output member configured to output the torque to the damper mechanism, a plurality of clutch plates configured to transmit the torque between the clutch input member and the clutch output member, a lock-up oil chamber plate formed in a disc shape, and a piston. The lock-up oil chamber plate is mounted between the front cover and an inner peripheral part of the turbine to be axially immovable with respect to the front cover, and forms a lock-up oil chamber. The piston is mounted between the front cover and the lock-up oil chamber plate to be axially movable, forms the lock-up oil chamber together with the lock-up oil chamber plate therebetween, and is configured to be moved toward the front cover by an operating oil to be supplied to the lock-up oil chamber to cause the clutch plates to be pressed against each other.

In the present device, when a lock-up state is produced, the operating oil is configured to be supplied to the lock-up oil chamber. The piston is thereby moved toward the front cover and presses the plural clutch plates. Under the condition, torque from the front cover is outputted from the clutch part to the turbine through the damper mechanism.

Here, the lock-up oil chamber is formed between the front cover and the turbine. Further, the piston is moved from the turbine side to the front-cover side, and the lock-up state is produced. Therefore, the axial dimension of the present lock-up device can be reduced than that of a well-known lock-up device.

A lock-up device for a torque converter according to a second aspect of the present invention relates to the lock-up device of the first aspect, and wherein the turbine has a tubular portion, which is coupled to the transmission-side member, on an inner peripheral end part thereof. Further, the clutch part includes an annular boss. The annular boss is fixed to the front cover while extending from an inner peripheral part of the lock-up oil chamber plate toward the front cover, and allows the piston to axially slide on an outer peripheral surface thereof. Further, the annular boss allows the tubular portion of the turbine to be inserted into an inner peripheral part thereof, and has an oil path formed for supplying the operating oil to the lock-up oil chamber.

A lock-up device for a torque converter according to a third aspect of the present invention relates to the lock-up device of the second aspect, and wherein the annular boss is a member formed separately from the lock-up oil chamber plate, and the lock-up oil chamber plate is fixed to the outer peripheral surface of the annular boss.

A lock-up device for a torque converter according to a fourth aspect of the present invention relates to the lock-up device of the second aspect, and wherein the annular boss is formed by extending an inner peripheral end part of the lock-up oil chamber plate toward the front cover.

A lock-up device for a torque converter according to a fifth aspect of the present invention relates to the lock-up device of any of the second to fourth aspects, and wherein the clutch part is mounted between the front cover and the piston to be axially immovable with respect to the front cover, and further includes a lock-up releasing oil chamber plate that is formed in a disc shape and forms a lock-up releasing oil chamber.

Here, the lock-up oil chamber and the lock-up releasing oil chamber are formed. Hence, responsiveness is enhanced in switching between the lock-up state and a lock-up released state.

A lock-up device for a torque converter according to a sixth aspect of the present invention relates to the lock-up device of the fifth aspect, and wherein inner and outer diameters of the lock-up oil chamber and inner and outer diameters of the lock-up releasing oil chamber are equal to each other.

Here, even when the operating oil is not being supplied to the lock-up oil chamber and the lock-up releasing oil chamber, hydraulic pressure is applied to the piston by means of centrifugal force. However, the inner and outer diameters of the both oil chambers are herein equal to each other. Hence, hydraulic pressures to be generated in the both oil chambers by centrifugal force will be equal to each other. Therefore, it is possible to inhibit occurrence of a situation that the piston is moved by means of the hydraulic pressure applied thereto by means of centrifugal force.

A lock-up device for a torque converter according to a seventh aspect of the present invention relates to the lock-up device of the fifth or sixth aspect, and wherein the annular boss has an oil path formed for supplying the operating oil to the lock-up releasing oil chamber.

A lock-up device for a torque converter according to an eighth aspect of the present invention relates to the lock-up device of any of the first to seventh aspects, and wherein the clutch input member is formed in a disc shape and has an inner peripheral end part extending toward the turbine. The clutch output member is disposed radially outward of the clutch input member, and is formed in a disc shape while having an inner peripheral end part extending toward the front cover. Further, the clutch plates include a first clutch plate that is formed in a disc shape and is engaged at an inner peripheral end part thereof with the inner peripheral end part of the clutch input member to be axially movable and non-rotatable relatively thereto, and a second clutch plate that is formed in a disc shape and is engaged at an outer peripheral end part thereof with the inner peripheral end part of the clutch output member to be axially movable and non-rotatable relatively thereto. The piston and the lock-up oil chamber plate are disposed radially inward of the clutch output member.

According to the present invention as described above, it is especially possible to reduce the axial dimension of a clutch part.

DETAILED DESCRIPTION OF THE EXEMPLARY EMBODIMENTS

First Exemplary Embodiment

Entire Structure of Torque Converter

Figure 1:
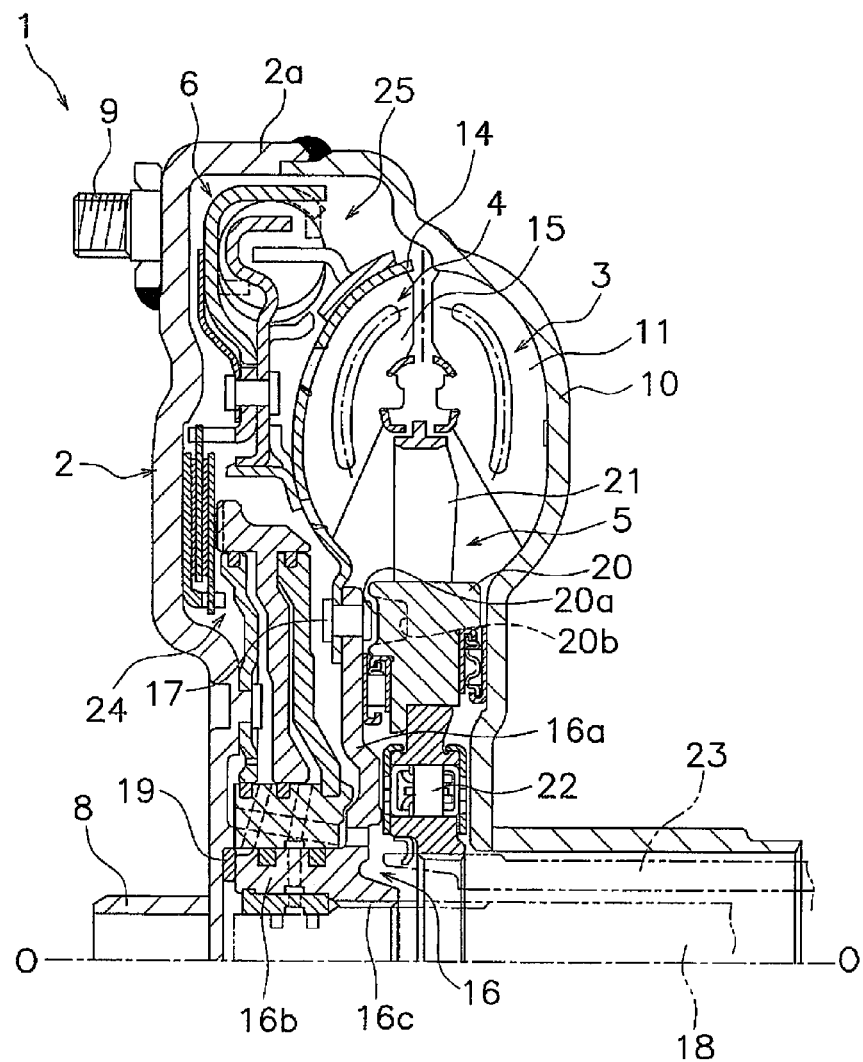
FIG. 1 is a partial cross-sectional view of a torque converter equipped with a lock-up device according to an exemplary embodiment of the present invention.

FIG. 1 is a vertical cross-sectional view of a torque converter 1 employing an exemplary embodiment of the present invention. The torque converter 1 is a device for transmitting torque from a crankshaft of an engine to an input shaft of a transmission. In FIG. 1, the engine (not illustrated in the drawing) is disposed on the left side, whereas the transmission (not illustrated in the drawing) is disposed on the right side. A line O-O depicted in FIG. 1 indicates a rotary axis of the torque converter 1.

The torque converter 1 mainly includes a front cover 2, a torque converter main body composed of three types of vane wheels (an impeller 3, a turbine 4 and a stator 5), and a lock-up device 6.

Front Cover

The front cover 2 is a disc-shaped member that a center boss 8 is fixed to the inner peripheral end thereof by welding. The center boss 8 is a cylindrical member extending in the axial direction, and is inserted into a center hole bored in the crankshaft (not illustrated in the drawings).

It should be noted that the front cover 2 is designed to be coupled to the crankshaft of the engine through a flexible plate, although not illustrated in the drawings. In other words, a plurality of bolts 9 are fixed to the engine-side surface of the outer peripheral part of the front cover 2, while being aligned at equal intervals in the circumferential direction. The outer peripheral part of the flexible plate is fixed to the front cover 2 by nuts screwed onto the bolts 9.

An outer peripheral tubular portion 2a is formed in the outer peripheral part of the front cover 2, while axially extending toward the transmission. The impeller 3 is fixed to the tip end of the outer peripheral tubular portion 2a by welding. As a result, the front cover 2 and the impeller 3 form a fluid chamber that operating oil is filled in the inside thereof.

Impeller

The impeller 3 is mainly composed of an impeller shell 10 and a plurality of impeller blades 11 fixed to the inside of the impeller shell 10. Further, as described above, the outer peripheral tip end of the impeller shell 10 is welded to the front cover 2. It should be noted that a tubular portion is formed on the inner peripheral end of the impeller shell 10, while extending toward the transmission.

Turbine

The turbine 4 is disposed axially in opposition to the impeller 3 within the fluid chamber. The turbine 4 is mainly composed of a turbine shell 14, a plurality of turbine blades 15 fixed to the inside of the turbine shell 14, and a turbine hub 16 fixed to the inner peripheral end part of the turbine shell 14. The turbine shell 14 and the turbine hub 16 are fixed by a plurality of rivets 17.

The turbine hub 16 has a disc-shaped flange portion 16a to which the inner peripheral end part of the turbine shell 14 is fixed, and a tubular portion 16b formed to extend from the inner peripheral part of the flange portion 16a toward the front cover 2. Further, as described above, the turbine shell 14 is fixed to the outer peripheral end part of the flange portion 16a by the rivets 17. Yet further, a spline hole 16c is bored in the inner peripheral part of the tubular portion 16b, and is meshed with a spline shaft formed on the tip end of the input shaft 18 of the transmission.

It should be noted that a thrust washer 19 is disposed between the front cover 2 and the tip end of the tubular portion 16b of the turbine hub 16. A plurality of grooves are formed on the turbine-hub-16 side surface of the thrust washer 19 to penetrate from the inner periphery to the outer periphery. These grooves function as lubricating grooves and oil paths.

Stator

The stator 5 is a mechanism disposed between the inner peripheral part of the impeller 3 and that of the turbine 4, and regulates the flow of the operating oil returning to the impeller 3 from the turbine 4. The stator 5 is integrally formed by forging of resin, aluminum alloy or so forth. The stator 5 is mainly composed of a stator shell 20 formed in an annular shape and a plurality of stator blades 21 formed on the outer peripheral surface of the stator shell 20. The stator shell 20 is coupled to a stationary shaft 23 through a one-way clutch 22.

It should be noted that an annular recessed portion 20a is formed on the front-cover-2 side surface of the stator shell 20 to be positioned in opposition to the rivets 17. This recessed portion 20a is formed for avoiding interference with the head portions of the rivets 17. Accordingly, the stator shell 20 and the flange portion 16a of the turbine hub 16 can be axially disposed closer to each other, and reduction in axial dimension is enabled. Further, the recessed portion 20a partially has a plurality of recesses 20b recessing toward the impeller 3. Accordingly, weight reduction can be achieved.

Further, a thrust bearing is disposed between the stator shell 20 and the impeller shell 10, while another thrust bearing is disposed between the stator shell 20 and the flange portion 16a of the turbine hub 16.

Lock-Up Device

The lock-up device 6 is a device disposed between the front cover 2 and the turbine 4, and directly transmits power from the front cover 2 to the turbine 4. The lock-up device 6 includes a clutch part 24 disposed between the front cover 2 and the turbine 4, and a damper mechanism 25 configured to transmit torque from the clutch part 24 to the turbine.

Clutch Part

The clutch part 24 is of a hydraulic actuated multi-plate type including a plurality of clutch plates. The clutch part 24 is configured to transmit torque from the front cover 2 to the damper mechanism 25 or block transmission of torque between the front cover 2 and the damper mechanism 25. As illustrated in an enlarged view of FIG. 2, the clutch part 24 includes a clutch input member 26, a clutch output member 27, a first clutch plate 28, a second clutch plate 29 and a piston 30.

The clutch input member 26 is an annular plate member, and is fixed to the front cover 2. The inner peripheral end part of the clutch input member 26 is bent toward the turbine 4, and a plurality of grooves are formed on the bent part while being aligned at predetermined intervals in the circumferential direction.

The clutch output member 27 is disposed radially outward of the clutch input member 26. The clutch output member 27 is formed in an annular shape and has a disc portion 27a formed in a disc shape, and a tubular portion 27b formed to extend from the inner peripheral end part of the disc portion 27a toward the front cover 2. The disc portion 27a is fixed to a power transmission plate (to be described) composing a part of the damper mechanism 25 by rivets 32. A plurality of grooves are formed on the tubular portion 27b to extend in the axial direction, while being aligned at equal intervals in the circumferential direction.

The first clutch plate 28 is formed in a disc shape, and a plurality of teeth are formed on the inner peripheral end of the first clutch plate 28 to be engaged with the plural grooves formed on the bent part of the clutch input member 26. With such structure, the first clutch plate 28 is axially movable with respect to and non-rotatable relative to the clutch input member 26.

The second clutch plate 29 is disposed adjacently to the first clutch plate 28, while being disposed between the first clutch plate 28 and the clutch input member 26. The second clutch plate 29 is formed in a disc shape, and a plurality of teeth are formed on the outer peripheral end of the second clutch plate 29 to be engaged with the plural grooves formed on the tubular portion 27b of the clutch output member 27. With such structure, the second clutch plate 29 is axially movable with respect to and non-rotatable relative to the clutch output member 27. Further, annular friction members are respectively fixed to the both surfaces of the second clutch plate 29.

The piston 30 is disposed radially inward of the clutch output member 27, while being disposed between the front cover 2 and the inner peripheral part of the turbine 4. The piston 30 is formed in an annular shape and has a pressure receiving portion 30a formed in a disc shape, and a pressing portion 30b formed on the outer peripheral part of the pressure receiving portion 30a. The pressure receiving portion 30a is configured to be axially moved by hydraulic pressure acting on the front-cover-2 side surface thereof and acting on the turbine-4 side surface thereof. The pressing portion 30b extends from the pressure receiving portion 30a toward both of the front cover 2 and the turbine 4. The pressing portion 30b is configured to be moved toward the front cover 2 and press the first clutch plate 28 and the second clutch plate 29 between the pressing portion 30b and the clutch input member 26.

The piston 30 is supported by a piston support mechanism 34 so as to be axially movable. The piston support mechanism 34 includes a support boss 35, a first flange 36 formed in a disc shape and a second flange 37 formed in a disc shape. As described below, the first flange 36 is a plate member composing a part of a lock-up releasing oil chamber. The second flange 37 is a plate member composing a part of a lock-up oil chamber.

The support boss 35 is formed in an annular shape, and the tubular portion 16b of the turbine hub 16 is inserted in the inside of the support boss 35. Further, the inner peripheral part of the front-cover-2 side surface of the support boss 35 is fixed to the front cover 2 by welding. A first seal member 38 and a second seal member 39 are mounted to the outer peripheral surface of the support boss 35. Further, the inner peripheral surface of the piston 30 slidably makes contact with the second seal member 39. Yet further, a small diameter portion 35a, having a diameter less than that of the other part, is formed on the turbine-4 side part of the outer peripheral surface of the support boss 35. This small diameter portion 35a further protrudes toward the turbine 4 than the turbine-4 side lateral surface of the support boss 35, and the protruding part is formed as a protruding portion 35b (in the drawings, the protruding portion 35b is illustrated in an outwardly bent state).

The first flange 36 is disposed on the front-cover-2 side of the pressure receiving portion 30a of the piston 30, while being fixed to the front cover 2 by swaging a protruding part formed on the front cover 2. It should be noted that a clearance is produced for circulating the operating oil between the first flange 36 and the front cover 2 except for the part that the both members are fixed to each other. A third seal member 40 is mounted to the outer peripheral surface of the first flange 36, while making contact with the inner peripheral surface of the pressing portion 30b of the piston 30. The inner peripheral surface of the first flange 36 makes contact with the first seal member 38 mounted to the outer peripheral surface of the support boss 35.

The second flange 37 is disposed on the turbine-4 side of the pressure receiving portion 30a of the piston 30. A fourth seal member 41 is mounted to the outer peripheral surface of the second flange 37, while making contact with the inner peripheral surface of the pressing portion 30b of the piston 30. The inner peripheral surface of the second flange 37 is press-fitted to the small diameter portion 35a of the support boss 35 and is further swaged by outwardly bending the protruding portion 35b by means of rolling.

Structure for Moving Piston

Figure 2:
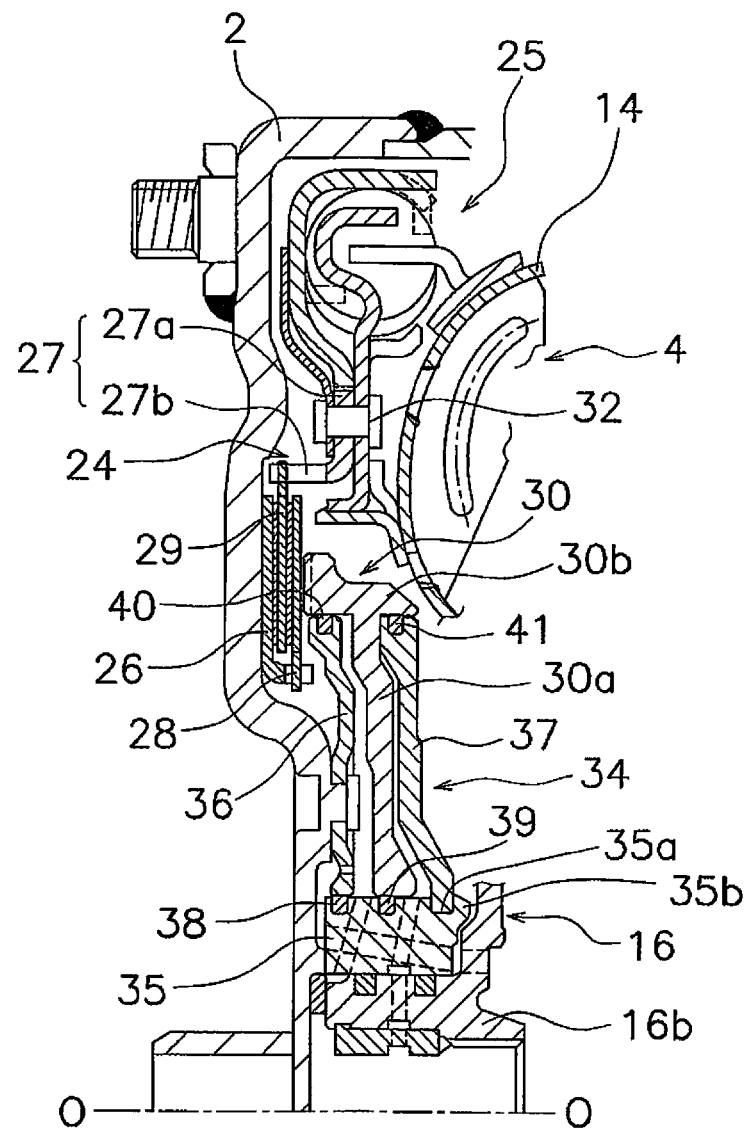
FIG. 2 is a diagram illustrating the lock-up device of the torque converter illustrated in FIG. 1.
Figure 3:
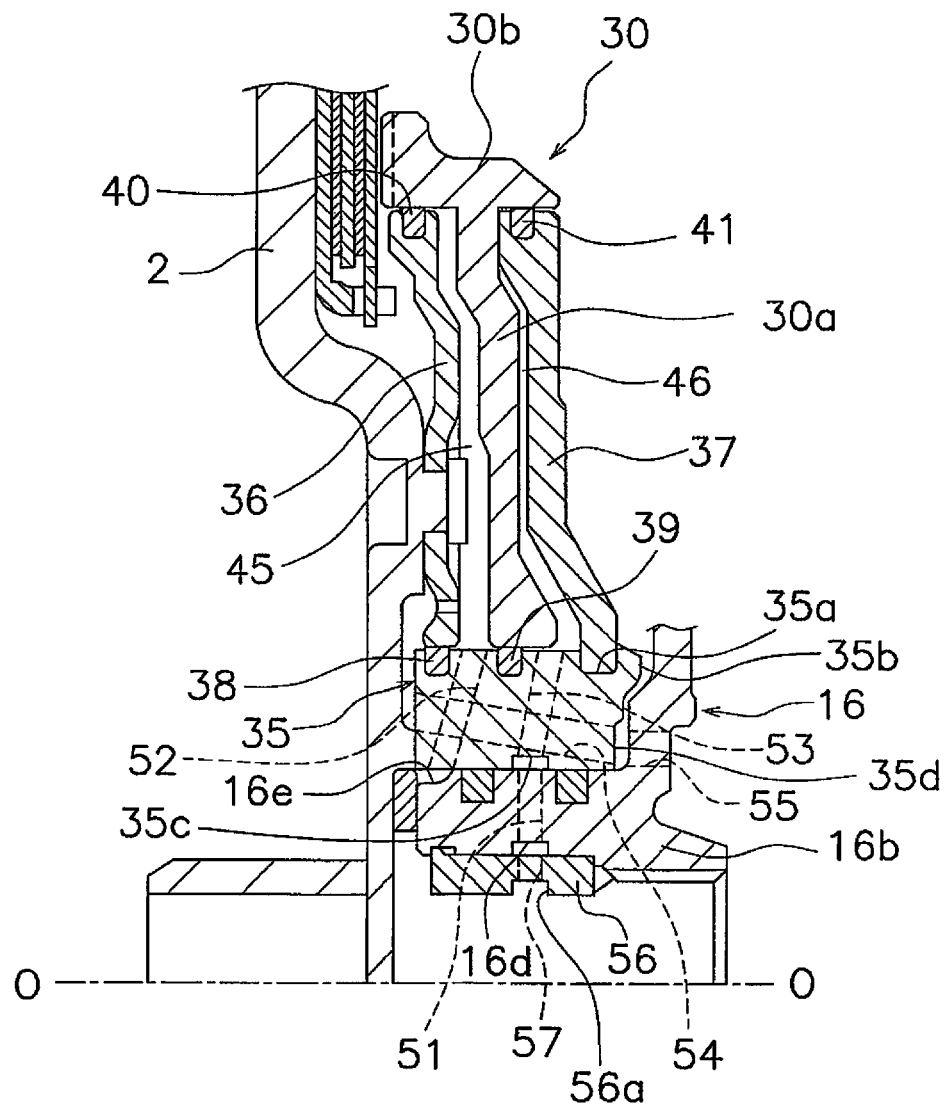
FIG. 3 is an enlarged view of a piston and a structure supporting the piston in the lock-up device illustrated in FIG. 2.

As illustrated in FIG. 2 and FIG. 3, which is a partial enlarged view of FIG. 2, the piston support mechanism 34 as described above forms the lock-up releasing oil chamber 45 between the pressure receiving portion 30a and the first flange 36, while forming the lock-up oil chamber 46 between the pressure receiving portion 30a and the second flange 37. The inner and outer diameters of the oil chamber 45 and those of the oil chamber 46 are equal to each other.

A plurality of first oil paths 51 are formed in the tubular portion 16b of the turbine hub 16, while radially penetrating therethrough. Further, a plurality of second oil paths 52, a plurality of third oil paths 53 and a plurality of fourth oil paths 54 are formed in the support boss 35. The second oil paths 52 are formed to radially penetrate through the support boss 35. Thus, the inner peripheral side of the support boss 35 and the lock-up releasing oil chamber 45 are communicated with each other through the second oil paths 52. The third oil paths 53 are formed to radially penetrate through the support boss 35. Thus, the inner peripheral surface of the support boss 35 and the lock-up oil chamber 46 are communicated with each other through the third oil paths 53. The fourth oil paths 54 are formed to axially penetrate through the support boss 35. Thus, a space produced on the turbine-4 side of the support boss 35 and a space produced on the front-cover-2 side of the support boss 35 are communicated with each other through the fourth oil paths 54.

An annular groove 16d is formed on the inner peripheral surface of the tubular portion 16b of the turbine hub 16, whereas an annular recess 16e is formed on the outer periphery of the tip end of the tubular portion 16b. The inner peripheral openings of the first oil paths 51 are located in the bottom surface of the groove 16d. The inner peripheral openings of the second oil paths 52 are bored to be located in opposition to the recess 16e.

An annular groove 35c is formed on the inner peripheral surface of the support boss 35. The inner peripheral openings of the third oil paths 53 are located in the bottom surface of the groove 35c. Further, an annular recess 35d is formed on the inner peripheral end part of the turbine-4 side surface of the support boss 35, while recessing toward the front cover 2. The recess 35d functions as an oil sump part.

The turbine-4 side openings of the fourth oil paths 54 are located in the recess 35d, whereas the front-cover-2 side openings of the fourth oil paths 54 are located in the space produced between the front cover 2 and the end surface of the support boss 35. It should be noted that a plurality of through holes 55 are bored in the inner peripheral end part of the flange portion 16a of the turbine hub 16, while axially penetrating therethrough. The plural through holes 55 are opposed to the recess 35d of the support boss 35.

A collar 56 is press-fitted to the inner peripheral part of the tubular portion 16b of the turbine hub 16. A plurality of through holes 57 are bored in the collar 56, while radially penetrating therethrough. An annular groove 56a is formed on the inner peripheral surface of the collar 56. The outer peripheral openings of the through holes 57 of the collar 56 are opposed to the groove 16d formed on the inner surface of the tubular portion 16b of the turbine hub 16.

Damper Mechanism

Figure 4:
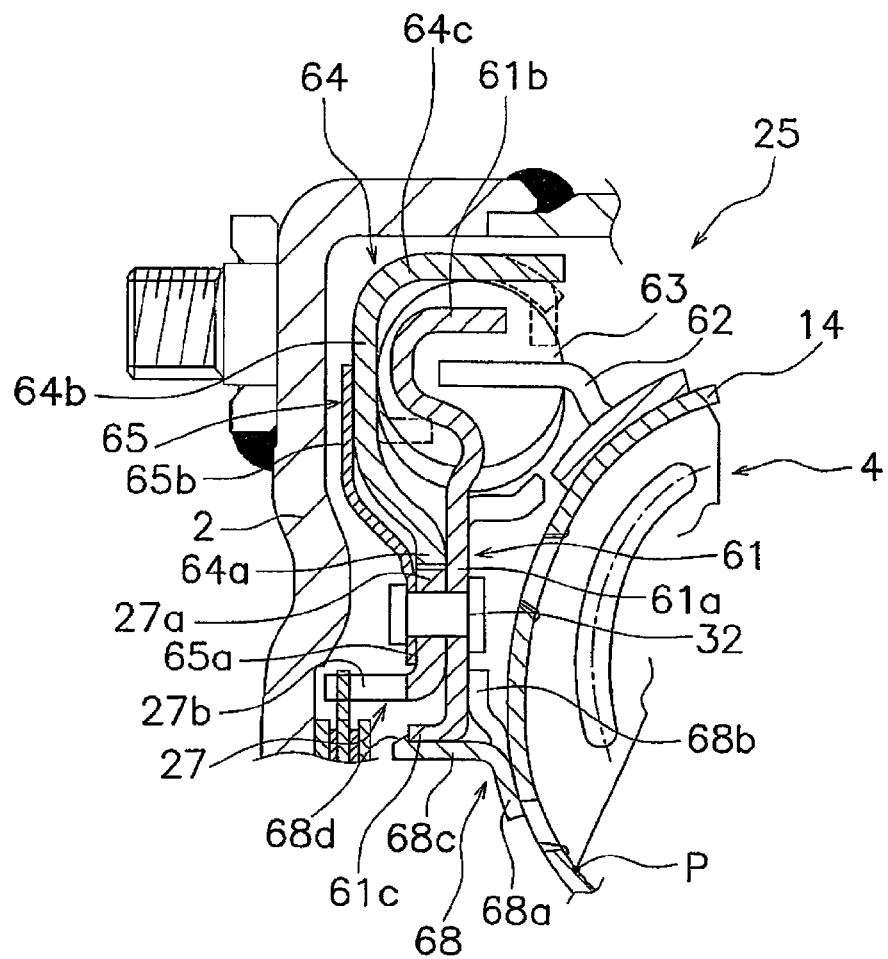
FIG. 4 is an enlarged view of a damper mechanism of the lock-up device illustrated in FIG. 2.

As illustrated in FIG. 4, the damper mechanism 25 includes a power transmission plate 61 to which the clutch output member 27 is fixed, an output plate 62 fixed to the turbine shell 14, a plurality of torsion springs 63, an intermediate member 64, and a restriction plate 65. It should be noted that FIG. 4 illustrates only the damper mechanism 25 and the related components thereof, which are extracted from the lock-up device 6.

The power transmission plate 61 is formed in an annular shape and has a disc portion 61a, an engaging portion 61b formed on the outer peripheral end of the disc portion 61a, and an inner peripheral tubular portion 61c formed on the inner peripheral end of the disc portion 61a to extend toward the front cover 2. As described above, the clutch output member 27 is fixed to the disc portion 61a by the rivets 32. The engaging portion 61b is engaged with the circumferential end surfaces of the torsion springs 63.

The output plate 62 is engaged with the both circumferential ends of each pair of torsion springs 63 (two torsion springs 63 in the present exemplary embodiment) configured to act in series. Accordingly, the torque inputted from the power transmission plate 61 is transmitted to the output plate 62 through the torsion springs 63, and is further transmitted to the turbine 4.

The intermediate member 64 is a member for causing each pair of (two) torsion springs in the plural torsion springs 63 to act in series. The intermediate member 64 is formed in an annular shape and has a cross-section formed in an inverted L-shape. The intermediate member 64 is disposed on the outer peripheral side of the clutch output member 27, and has an inner peripheral end portion 64a, a lateral support portion 64b and an outer support portion 64c.

The inner peripheral end portion 64a extends to the inner peripheral side along the disc portion 61a of the power transmission plate 61. The inner peripheral surface of the inner peripheral end portion 64a is contactable to the outer peripheral surface of the clutch output member 27. Accordingly, the intermediate member 64 is radially positioned. Further, the turbine-4 side surface of the inner peripheral end portion 64a is contactable to the disc portion 61a of the power transmission plate 61. Accordingly, the intermediate member 64 is restricted from moving toward the turbine 4. The lateral support portion 64b extends to the outer peripheral side from the inner peripheral end portion 64a, and supports the front-cover-2 side lateral parts of the torsion springs 63. Further, pawls (not illustrated in the drawings) are formed to extend from the lateral support portion 64b toward the turbine 4, and support the end surfaces of each pair of torsion springs 63. The outer support portion 64c extends from the outer peripheral end of the lateral support portion 64b toward the turbine 4, and supports the outer peripheral parts of the torsion springs 63.

The restriction plate 65 is formed by a plate with a plate thickness less than that of the intermediate member 64. The restriction plate 65 is formed in an annular shape, and has a fixation portion 65a and an axial restriction portion 65b.

The fixation portion 65a is formed in a disc shape, and is fixed to the clutch output member 27 and the power transmission plate 61 by the rivets 32. The axial restriction portion 65b is formed to extend from the fixation portion 65a to the outer peripheral side, and is contactable to the front-cover-2 side surface of the lateral support portion 64b of the intermediate member 64. Accordingly, the intermediate member 64 is restricted from moving toward the front cover 2.

With the structure as described above, the intermediate member 64 is radially positioned by the outer peripheral surface of the clutch output member 27. Further, the intermediate member 64 is axially positioned by the power transmission plate 61 and the restriction plate 65.

Positioning Structure for Power Transmission Plate

As illustrated in FIG. 4, a power transmission plate support member 68 is mounted to the inner peripheral side of the power transmission plate 61. The power transmission plate support member 68 is formed in an annular shape and has a fixation portion 68a, a first axial restriction portion 68b, a radial restriction portion 68c and a second axial restriction portion 68d. The power transmission plate support member 68 is disposed on the outer peripheral side than the most inner peripheral part (i.e., a position depicted with P in FIG. 4) in an operating oil outlet of the turbine 4.

The fixation portion 68a is fixed to the turbine shell 14, while being disposed on the outer peripheral side than the pressure receiving portion 30a of the piston 30. The first axial restriction portion 68b is formed by partially extending the fixation portion 68a to the outer peripheral side. The first axial restriction portion 68b is contactable to the turbine-4 side surface of the disc portion 61a of the power transmission plate 61. The radial restriction portion 68c is formed by bending a part of the fixation portion 68a, i.e., a part on which the first axial restriction portion 68b is not formed, toward the front cover 2. The radial restriction portion 68c is contactable to the inner peripheral surface of the inner peripheral tubular portion 61c of the power transmission plate 61. The second axial restriction portion 68d is a protruding portion formed on the tip end of the radial restriction portion 68c and protrudes to the outer peripheral side. The second axial restriction portion 68d is contactable to the tip end of the inner peripheral tubular portion 61c.

With the structure as described above, the power transmission plate 61 and the clutch output member 27 are radially and axially positioned by the power transmission plate support member 68.

Actions

Figure 5:
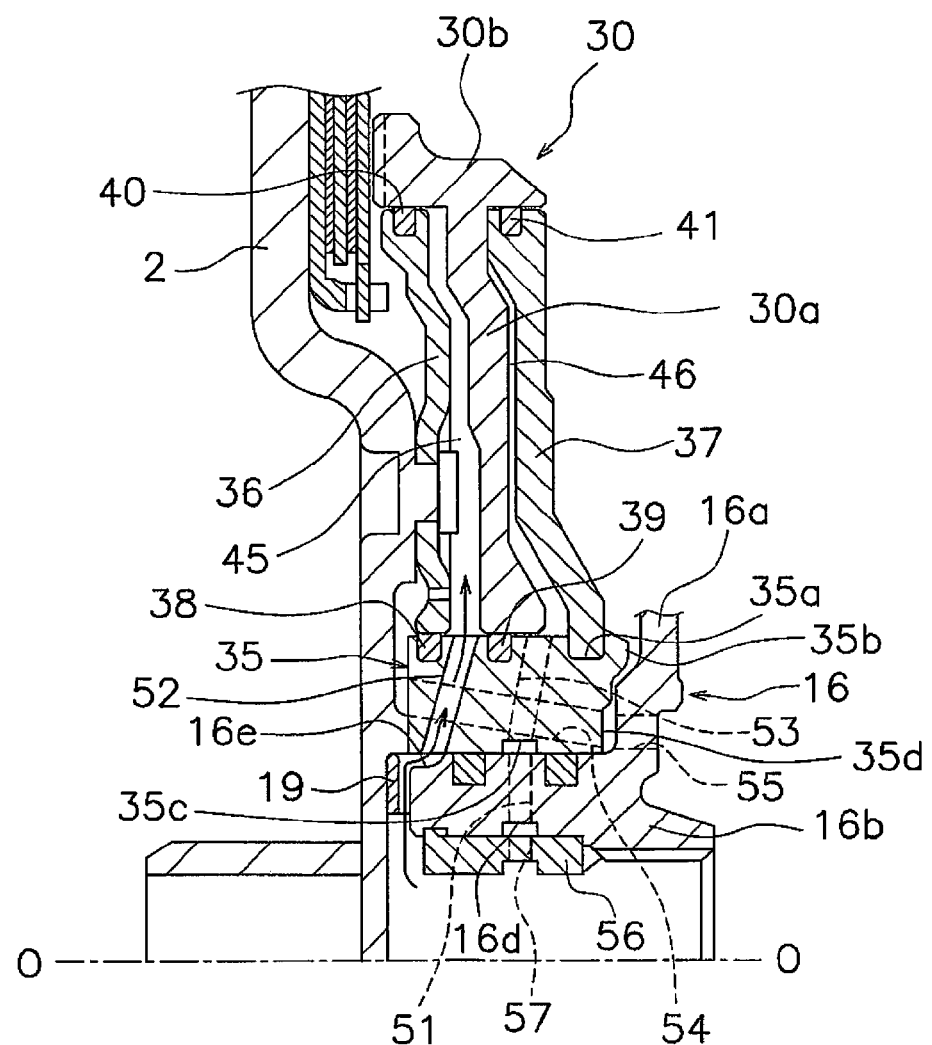
FIG. 5 is a diagram for explaining an operating oil flow in releasing a lock-up state of the lock-up device.

When the lock-up state of the lock-up device 6 is released, as illustrated in FIG. 5, the lock-up oil chamber 46 is connected to a drain, while the operating oil is supplied to the space between the front cover 2 and the front end part of the turbine hub 16 from a control valve (not illustrated in the drawing). The operating oil is supplied to the lock-up releasing oil chamber 45 via the grooves formed on the thrust washer 19 and the recess 16e formed on the outer periphery of the tip end part of the turbine hub 16 and further via the second oil paths 52 of the support boss 35. Accordingly, the piston 30 is moved toward the turbine 4, while the pressing portion 30b of the piston 30 is separated away from the first clutch plate 28 and the second clutch plate 29.

Figure 6:
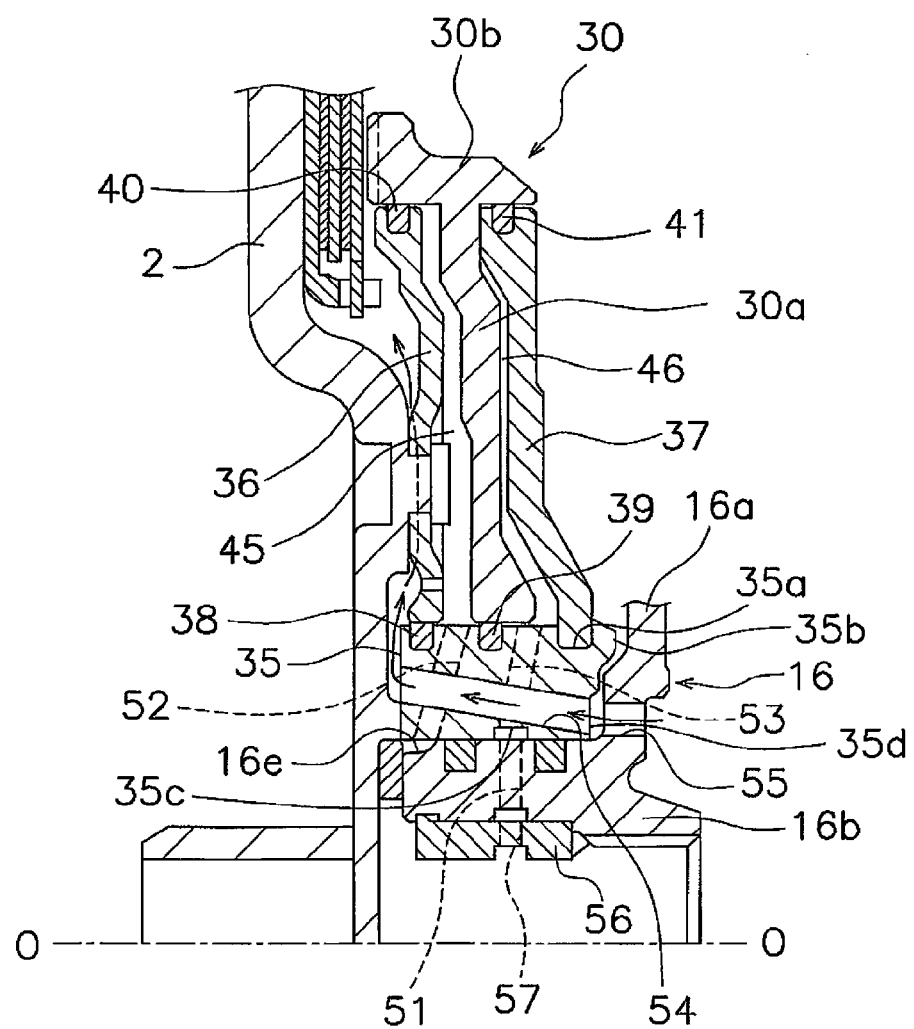
FIG. 6 is a diagram for explaining an operating oil flow directed to a torque converter main body.

Further, oil for torque converter actuation is supplied from the space between the input shaft 18 of the transmission and the stationary shaft 23. As illustrated in FIG. 6, the operating oil is directed to the space between the support boss 35 and the front cover 2 via the through holes 55 of the turbine hub 16 and the fourth oil paths 54.

It should be noted that the recess 35d is formed between the through holes 55 and the fourth oil paths 54. Hence, the operating oil, supplied to the support boss 35 side through the through holes 55, is once accumulated in the recess 35d, and is then directed toward the fourth oil paths 54. Therefore, even when the through holes 55 and the fourth oil paths 54 are not axially aligned with each other, the operating oil is supposed to smoothly flow between these oil paths 55 and 54.

The operating oil, supplied to the space between the support boss 35 and the front cover 2, is directed to the outer peripheral side through the clearance produced between the front cover 2 and the first flange 36, and is further directed to the outer peripheral end part of the front cover 2 through the spaces among the first clutch plate 28, the second clutch plate 29 and the piston 30. Thereafter, the operating oil is supplied to the torque converter main body. The operating oil within the torque converter main body flows to the control valve (not illustrated in the drawings) through an oil path produced between the stator shell 20 and the impeller shell 10.

In the condition as described above, the torque from the front cover 2 is transmitted from the impeller 3 to the turbine 4 by operating oil, and is further transmitted to the input shaft 18 of the transmission.

Figure 7:
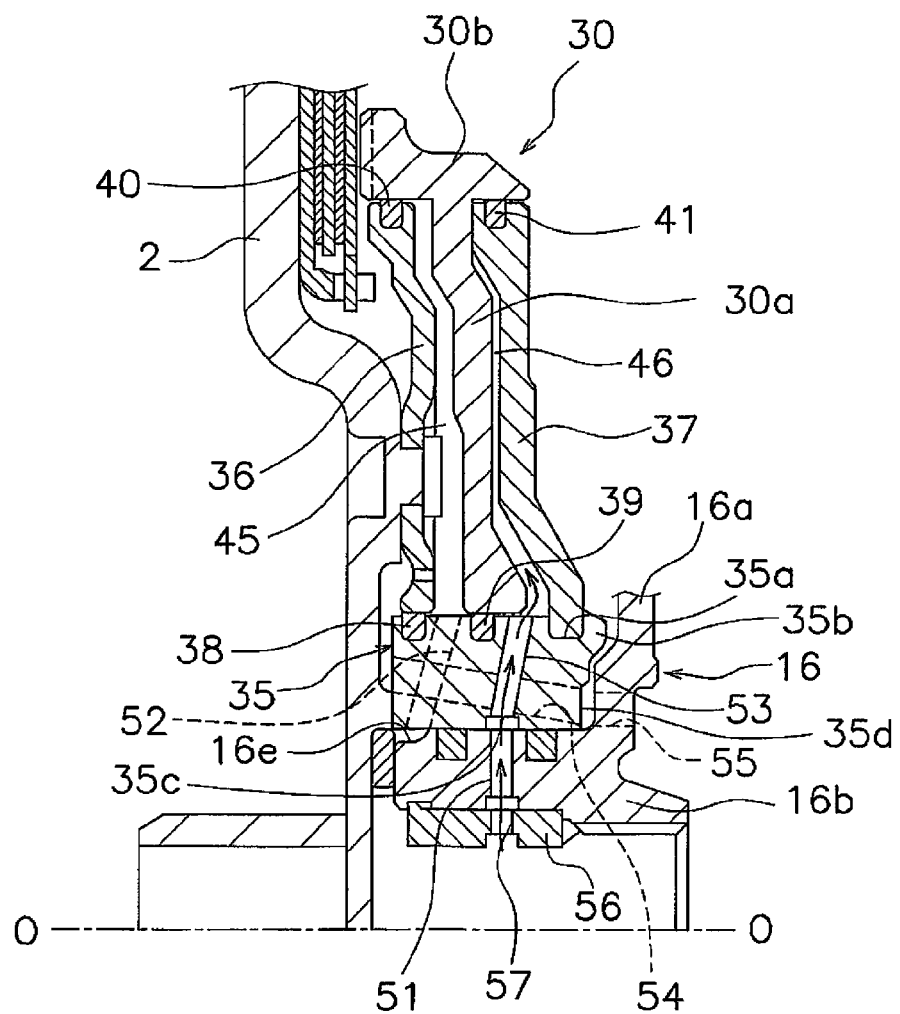
FIG. 7 is a diagram for explaining an operating oil flow in the lock-up state of the lock-up device.

By contrast, when the lock-up device is turned into a lock-up state (power transmitted state), the lock-up releasing oil chamber 45 is connected to the drain, while the operating oil is supplied to the inner periphery of the collar 56 through the inside of the input shaft 18 as illustrated in FIG. 7. The operating oil is supplied to the lock-up oil chamber 46 through the sequential path of: the through holes 57 of the collar 56; the first oil paths 51; and the third oil paths 53. Accordingly, the piston 30 is moved toward the front cover 2, and the first clutch plate 28 and the second clutch plate 29 are pressed against each other.

In the condition as described above, the torque from the front cover 2 is transmitted to the damper mechanism 25 through the sequential path of the clutch input member 26, the first clutch plate 28 and the second clutch plate 29, and the clutch output member 27 in this order.

In the damper mechanism 25, the torque inputted into the power transmission plate 61 from the clutch part 24 is transmitted to the turbine 4 through the torsion springs 63 and the output plate 62, and is further transmitted to the input shaft 18 of the transmission through the turbine hub 16.

In the lock-up device 6 as described above, the power transmission plate 61 is radially and axially positioned by the power transmission plate support member 68. Further, the intermediate member 64 is restricted from radially moving, while being positioned by the clutch output member 27. Yet further, the intermediate member 64 is restricted from axially moving, while being positioned by the restriction plate 65 and the power transmission plate 61.

Features

The power transmission plate 61 can be radially and axially positioned by the single power transmission plate support member 68, and therefore, the present device can be simply structured.

The power transmission plate support member 68 is fixed to the turbine shell 14. Hence, a space for disposing one or more other members can be reliably produced between the turbine inner peripheral part and the front cover 2. In the present exemplary embodiment, members for composing the piston 30 and the oil chambers of the lock-up device are disposed in the space. Therefore, the device can be entirely reduced in the axial dimension thereof.

The lock-up state is produced by fixing the clutch input member 26 of the clutch part 24 to the front cover and by moving the piston 30 from the turbine-4 side to the front-cover-2 side. Therefore, the device can be reduced in the axial dimension thereof in comparison with a structure that the lock-up state is produced by moving the piston disposed on the front cover side to the turbine side.

The clutch output member 27 restricts the intermediate member 64 from radially moving. Hence, it is possible to reduce a space occupied by the lock-up device 6. Further, the restriction plate 65 with a relatively small thickness and the power transmission plate 61 restrict the intermediate member 64 from axially moving. Hence, axial space saving can be further achieved. Especially, the axial space of a clutch part of a multi-plate type tends to be elongated. Hence, the axial space can be inhibited from being elongated with use of the structure of the present exemplary embodiment.

The piston 30 is configured to be moved by supplying the operating oil to the lock-up releasing oil chamber 45 and the lock-up oil chamber 46, and accordingly, the lock-up state and the lock-up released state are configured to be switched back and forth. Therefore, better responsiveness can be obtained in switching between the states. Further, drag torque can be suppressed in releasing the lock-up state.

The lock-up oil chamber 46 is provided independently from the other operating oil circuit. Therefore, stable lock-up torque capacity can be obtained in comparison with a structure configured to produce the lock-up state by utilizing the operating oil to be supplied to the torque converter main body.

The inner and outer diameters of the lock-up releasing oil chamber 45 and those of the lock-up oil chamber 46 are equal to each other. Hence, while the operating oil is not being supplied to any of the oil chambers, hydraulic pressures to be produced in the both oil chambers 45 and 46 are equalized by means of centrifugal force. Therefore, the piston 30 can be maintained in a neutral position.

Second Exemplary Embodiment

Figure 8:
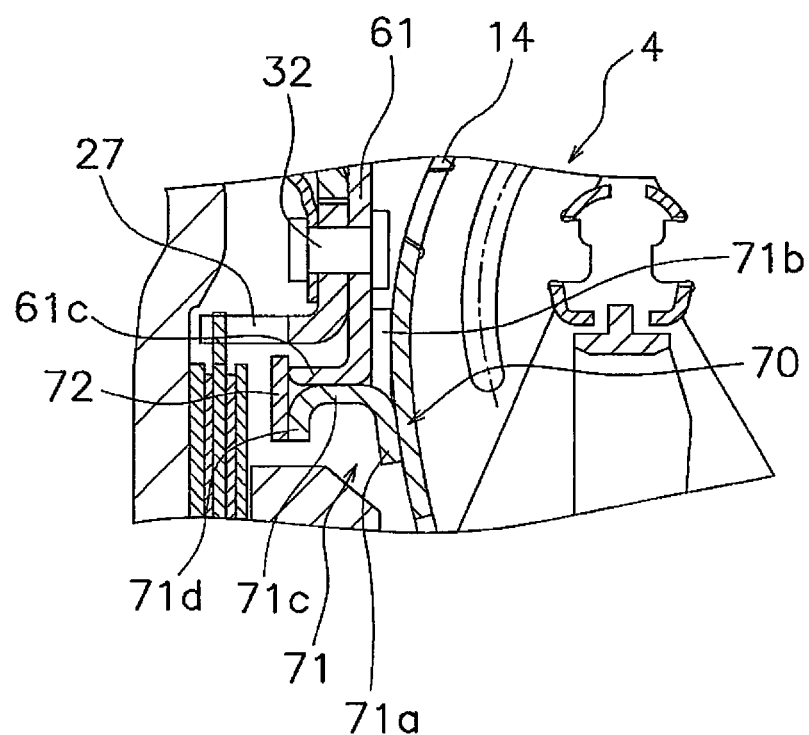
FIG. 8 is a diagram illustrating a power transmission plate support member according to another exemplary embodiment of the present invention.

FIG. 8 illustrates another exemplary embodiment of a power transmission plate support member. This power transmission plate support member 70 is composed of a first plate 71 and a second plate 72.

The first plate 71 is formed in an annular shape, and is composed of a fixation portion 71a, an first axial restriction portion 71b, a radial restriction portion 71c and a second plate support portion 71d. The structures of the fixation portion 71a, the first axial restriction portion 71b and the radial restriction portion 71c are the same as those of the fixation portion 68a, the first axial restriction portion 68b and the radial restriction portion 68c in the power transmission plate support member 68 of the first exemplary embodiment. The second plate support portion 71d is formed by bending the radial restriction portion 71c to the inner peripheral side.

The second plate 72 is formed in a disc shape, and the inner peripheral part thereof is fixed to the second plate support portion 71d of the first plate 71 by spot welding or so forth. The outer peripheral part of the second plate 72 is disposed to protrude from the radial restriction portion 71c of the first plate 71 to the further outer peripheral side. Further, the tip end of the tubular portion 61c of the power transmission plate 61 is configured to be contactable to the second plate 72. In other words, the second plate 72 functions as a second axial restriction portion.

With the structure as described above, the power transmission plate 61 and the clutch output member 27 are radially and axially positioned by the first and second plates 71 and 72 composing the power transmission plate support member 70.

Third Exemplary Embodiment

Figure 9:
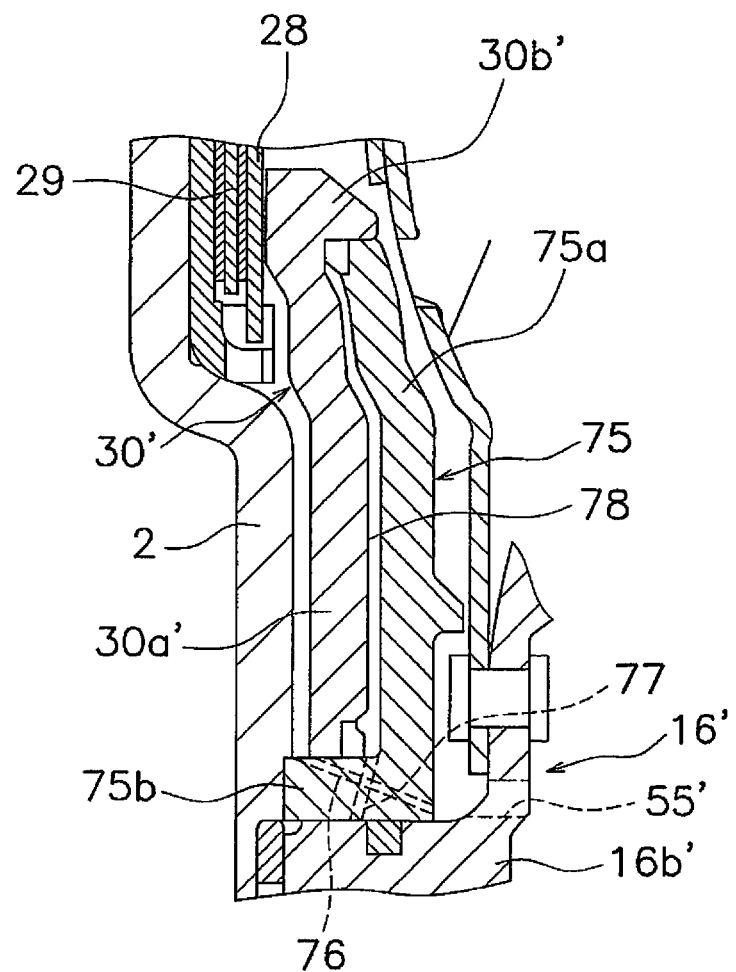
FIG. 9 is an enlarged view of a piston and a structure for supporting the piston according to yet another exemplary embodiment of the present invention.

FIG. 9 illustrates another exemplary embodiment of the structure for moving the piston. In this exemplary embodiment, a piston support member 75 is mounted to the outer peripheral surface of a tubular portion 16b' of a turbine hub 16'.

The piston support member 75 is disposed between the front cover 2 and the turbine 4, and is composed of: a disc portion 75a functioning as a plate composing a part of a lock-up oil chamber; and a tubular portion 75b. The outer peripheral part of the disc portion 75a extends to reach the first clutch plate 28 and the second clutch plate 29. The tubular portion 75b extends from the inner peripheral end part of the disc portion 75a toward the front cover 2. The tubular portion 16b' of the turbine hub 16' is inserted into the inside of the tubular portion 75b. Further, the tip end of the tubular portion 75b is fixed to the front cover 2 by welding or so forth.

A piston 30' is disposed between the front cover 2 and the disc portion 75a of the piston support member 75. The piston 30' has a pressure receiving portion 30a' formed in a disc shape and a pressing portion 30b'. The inner peripheral surface of the pressure receiving portion 30a' is slidably supported by the outer peripheral surface of the tubular portion 75b of the piston support member 75. The pressing portion 30b' is formed on the outer peripheral part of the pressure receiving portion 30a' and is capable of pressing the first clutch plate 28 and the second clutch plate 29.

First oil paths 76 and second oil paths 77 are formed in the tubular portion 75b of the piston support member 75. The first oil paths 76 are formed such that the front-cover-2 side space of the piston 30' and the turbine-4 side space of the piston support member 75 are communicated with each other. Further, the turbine hub 16' has through holes 55' formed for supplying the operating oil from the control valve to the space produced between the piston 30' and the turbine 4. The second oil paths 77 are formed such that oil paths (not illustrated in the drawing) formed in the tubular portion 16b' of the turbine hub 16' and a space (lock-up oil chamber) 78 produced between the piston 30' and the disc portion 75a of the piston support member 75 are communicated with each other.

In the present exemplary embodiment, when the lock-up state of the lock-up device 6 is released, the lock-up oil chamber 78 is configured to be connected to the drain and the operating oil from the control valve is configured to be supplied to the front-cover-2 side space of the piston 30' via the through holes 55' and the first oil paths 76.

Accordingly, the piston 30' is moved toward the turbine 4, and the pressing portion 30b' of the piston 30' is separated away from the first clutch plate 28 and the second clutch plate 29. It should be noted that as with the aforementioned exemplary embodiment, the operating oil, supplied to the front-cover-2 side space of the piston 30', is directed to the outer peripheral end part of the front cover 2, and is then supplied to the inside of the torque converter main body.

In the condition as described above, torque from the front cover 2 is transmitted from the impeller 3 to the turbine 4 through the operating oil, and is further transmitted to the input shaft 18 of the transmission.

By contrast, when the lock-up state is produced, the operating oil is configured to be supplied to the lock-up oil chamber 78 via the oil paths formed in the tubular portion 16b' of the turbine hub 16' and the second oil paths 77.

Accordingly, the piston 30' is moved toward the front cover 2, and the first clutch plate 28 and the second clutch plate 29 are pressed against each other.

In the condition as described above, the torque from the front cover 2 is transmitted to the damper mechanism 25 through the path of the clutch input member 26, the first clutch plate 28 and the second clutch plate 29, and the clutch output member 27.

Fourth Exemplary Embodiment

Figure 10:
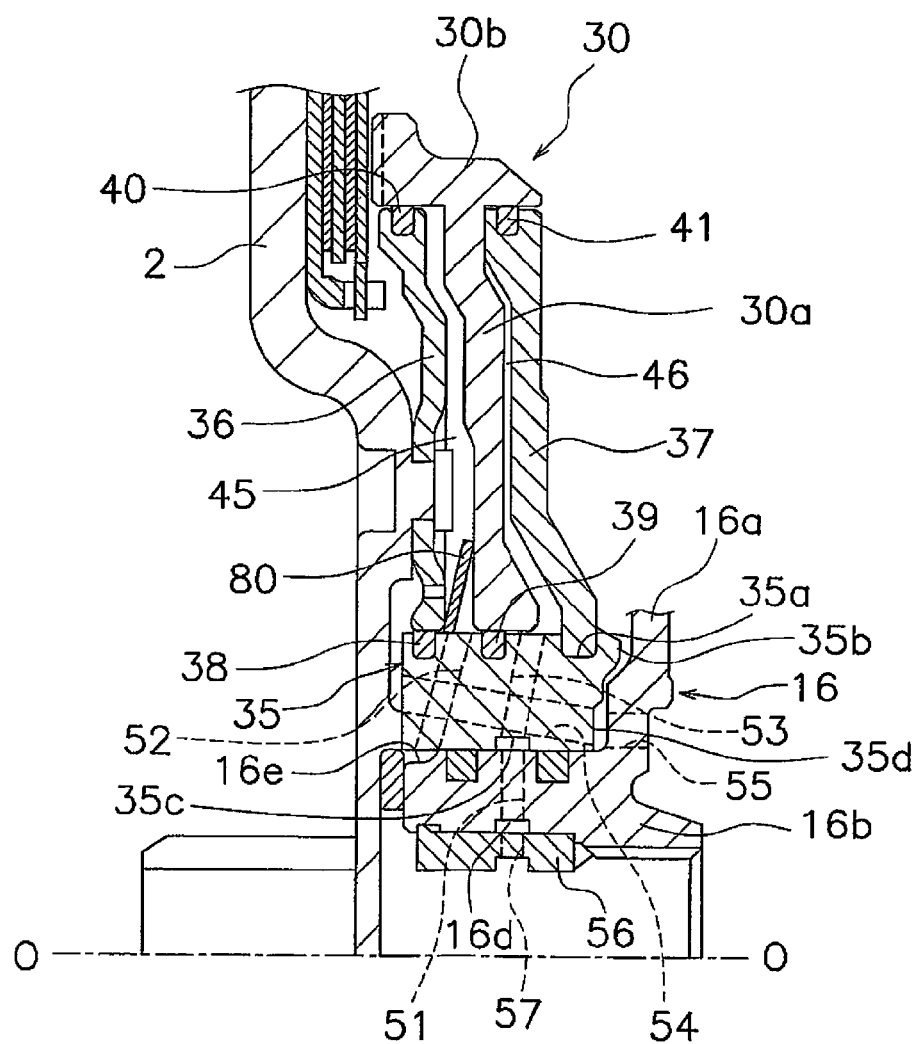
FIG. 10 is a diagram illustrating a mechanism for piston actuation according to further yet another exemplary embodiment of the present invention.

FIG. 10 illustrates yet another exemplary embodiment. Here, a cone spring 80 is disposed in the lock-up releasing oil chamber 45 of the first exemplary embodiment. The other structures are similar to those of the first exemplary embodiment.

The cone spring 80 is mounted for urging the piston 30 toward the turbine 4. In this case, in producing the lock-up released state, the lock-up state can be released only by supplying a low hydraulic pressure to the lock-up releasing oil chamber 45. Further, chances are that some load settings of the cone spring 80 eliminate necessity of supplying the operating oil for releasing the lock-up state.

Other Exemplary Embodiments

The present invention is not limited to the exemplary embodiments as described above, and a variety of changes or modifications can be made without departing from the scope of the present invention.

According to the lock-up device of the present invention, it is possible to especially reduce the axial dimension of a clutch part.

The invention claimed is:

1. A lock-up device for a torque converter, the lock-up device being configured to transmit a torque from a front cover to a transmission-side member through a turbine of the torque converter, the lock-up device comprising:
    a clutch part disposed between the front cover and the turbine, the clutch part being configured to allow or block transmission of the torque; and
    a damper mechanism configured to transmit the torque from the clutch part to the turbine and to absorb and attenuate a torsional vibration, the clutch part including
        a clutch input member disposed between the front cover and the turbine while being coupled to the front cover;
        a clutch output member configured to output the torque to the damper mechanism;
        a plurality of clutch plates configured to transmit the torque between the clutch input member and the clutch output member;
        a lock-up oil chamber plate formed in a disc shape, the lock-up oil chamber plate being mounted between the front cover and an inner peripheral part of the turbine to be axially immovable with respect to the front cover, the lock-up oil chamber plate forming a lock-up oil chamber; and
        a piston mounted between the front cover and the lock-up oil chamber plate to be axially movable, the piston forming the lock-up oil chamber together with the lock-up oil chamber plate therebetween, the piston being configured to be moved toward the front cover by an operating oil to be supplied to the lock-up oil chamber to cause the clutch plates to be pressed against each other;
    the turbine including a tubular portion on an inner peripheral end part thereof, the tubular portion being coupled to the transmission-side member;
    the clutch part further including an annular boss, the annular boss being fixed to the front cover while extending from an inner peripheral part of the lock-up oil chamber plate toward the front cover, the annular boss allowing the piston to axially slide on an outer peripheral surface thereof, the annular boss allowing the tubular portion of the turbine to be inserted into an inner peripheral part thereof, the annular boss having an oil path formed for supplying the operating oil to the lock-up oil chamber, and
    the clutch part further including a lock-up releasing oil chamber plate mounted between the front cover and the piston to be axially immovable with respect to the front cover, the lock-up releasing oil chamber plate being formed in a disc shape and forming a lock-up releasing oil chamber, a seal member being disposed between the lock-up releasing oil chamber plate and the piston to seal the lock-up releasing oil chamber with respect to the piston.

2. The lock-up device for a torque converter recited in claim 1, wherein
    the annular boss is a member formed separately from the lock-up oil chamber plate, and
    the lock-up oil chamber plate is fixed to the outer peripheral surface of the annular boss.

3. The lock-up device for a torque converter recited in claim 1, wherein
    the annular boss is formed by extending an inner peripheral end part of the lock-up oil chamber plate toward the front cover.

4. The lock-up device for a torque converter recited in claim 1, wherein
    inner and outer diameters of the lock-up oil chamber and inner and outer diameters of the lock-up releasing oil chamber are equal to each other.

5. The lock-up device for a torque converter recited in claim 1, wherein
the annular boss has an oil path formed for supplying the operating oil to the lock-up releasing oil chamber.

6. The lock-up device for a torque converter recited in claim 1, wherein
the clutch input member is formed in a disc shape and has an inner peripheral end part extending toward the turbine,
the clutch output member is disposed radially outward of the clutch input member, the clutch output member being formed in a disc shape and having an inner peripheral end part extending toward the front cover,
the clutch plates include a first clutch plate and a second clutch plate, the first clutch plate being formed in a disc shape and being engaged at an inner peripheral end part thereof with the inner peripheral end part of the clutch input member to be axially movable and non-rotatable relative thereto, the second clutch plate being formed in a disc shape and being engaged at an outer peripheral end part thereof with the inner peripheral end part of the clutch output member to be axially movable and non-rotatable relative thereto, and
the piston and the lock-up oil chamber plate are disposed radially inward of the clutch output member.

\* \* \* \* \*